United States Patent [19]
Fischer

[11] Patent Number: 5,906,389
[45] Date of Patent: May 25, 1999

[54] GAS BAG MODULE FOR A VEHICLE OCCUPANT RESTRAINT SYSTEM

[75] Inventor: Anton Fischer, Heuchlingen, Germany

[73] Assignee: TRW Occupant Restraint Systems GmbH, Alfdorf, Germany

[21] Appl. No.: 08/927,719

[22] Filed: Sep. 11, 1997

[30] Foreign Application Priority Data

Sep. 27, 1996 [DE] Germany .................. 296 16 916 U

[51] Int. Cl.⁶ ............................................. B60R 21/16
[52] U.S. Cl. ............................... 280/728.2; 280/731
[58] Field of Search ........................ 280/728.2, 731, 280/728.1; 200/61.54

[56] References Cited

U.S. PATENT DOCUMENTS

| | | | |
|---|---|---|---|
| 4,183,550 | 1/1980 | Sudou | 280/731 X |
| 4,938,503 | 7/1990 | Muraoka et al. | 280/731 |
| 5,333,897 | 8/1994 | Landis et al. | 280/728.2 |
| 5,380,037 | 1/1995 | Worrell et al. | 280/728.2 |
| 5,470,100 | 11/1995 | Gordon | 280/728.2 |
| 5,560,642 | 10/1996 | Davidson et al. | 280/728.2 |
| 5,639,113 | 6/1997 | Goss et al. | 280/728.2 |

*Primary Examiner*—Christopher P. Ellis
*Attorney, Agent, or Firm*—Tarolli, Sundheim, Covell, Tummino & Szabo

[57] ABSTRACT

A gas bag module for a vehicle occupant restraint system includes an inflator, a gas bag and at least two fastener bolts. Each of the fastener bolts comprises a fastening projection protruding from the gas bag module for fastening the gas bag module to a vehicle part.

3 Claims, 1 Drawing Sheet

GAS BAG MODULE FOR A VEHICLE OCCUPANT RESTRAINT SYSTEM

The invention relates to a gas bag module for a vehicle occupant restraint system.

BACKGROUND OF THE INVENTION

Typical gas bag modules for a vehicle occupant restraint system comprise an inflator, a gas bag and at least two fastener bolts.

Such a gas bag module is, for instance, accommodated in a vehicle steering wheel, in case of a driver's side gas bag module, or in the dashboard on the front passenger side, in order to provide restraint for the vehicle occupant by the gas bag being deployed by the compressed gas provided by the inflator, when required. As a rule, the gas bag module is connected to the vehicle by separate fastener elements, for example, by bolts or rivets.

BRIEF DESCRIPTION OF THE INVENTION

By contrast, the invention provides a gas bag module for a vehicle occupant restraint system, which includes an inflator, a gas bag and at least two fastener bolts. Each of the fastener bolts comprises a fastening projection protruding from the gas bag module for fastening the gas bag module to a vehicle part. As a result of this, the same fastener bolts employed for fastening the various components of the gas bag module may be simultaneously made use of for fastening the gas bag module, thus eliminating the fastener elements additionally necessary according to prior art. Accordingly, there is a reduction in weight and in the costs of the gas bag module.

In accordance with a preferred embodiment of the invention, it is provided that the fastening projection comprises a circumferential groove adapted to be engaged by an arresting part extending transversely to a longitudinal direction of the fastener bolt in the vehicle part. In this way, the gas bag module according to the invention can be fastened to a vehicle part by particularly simple means.

Advantageous embodiments of the invention are evident from the sub-claims.

BRIEF DESCRIPTION OF THE DRAWING

The invention will now be described with respect to a preferred embodiment as depicted in the enclosed drawing, in which the sole FIGURE shows a schematic cross-section through a gas bag module in accordance with the invention, which is applied to a vehicle steering wheel.

DETAILED DESCRIPTION OF THE INVENTION

Figure 1:
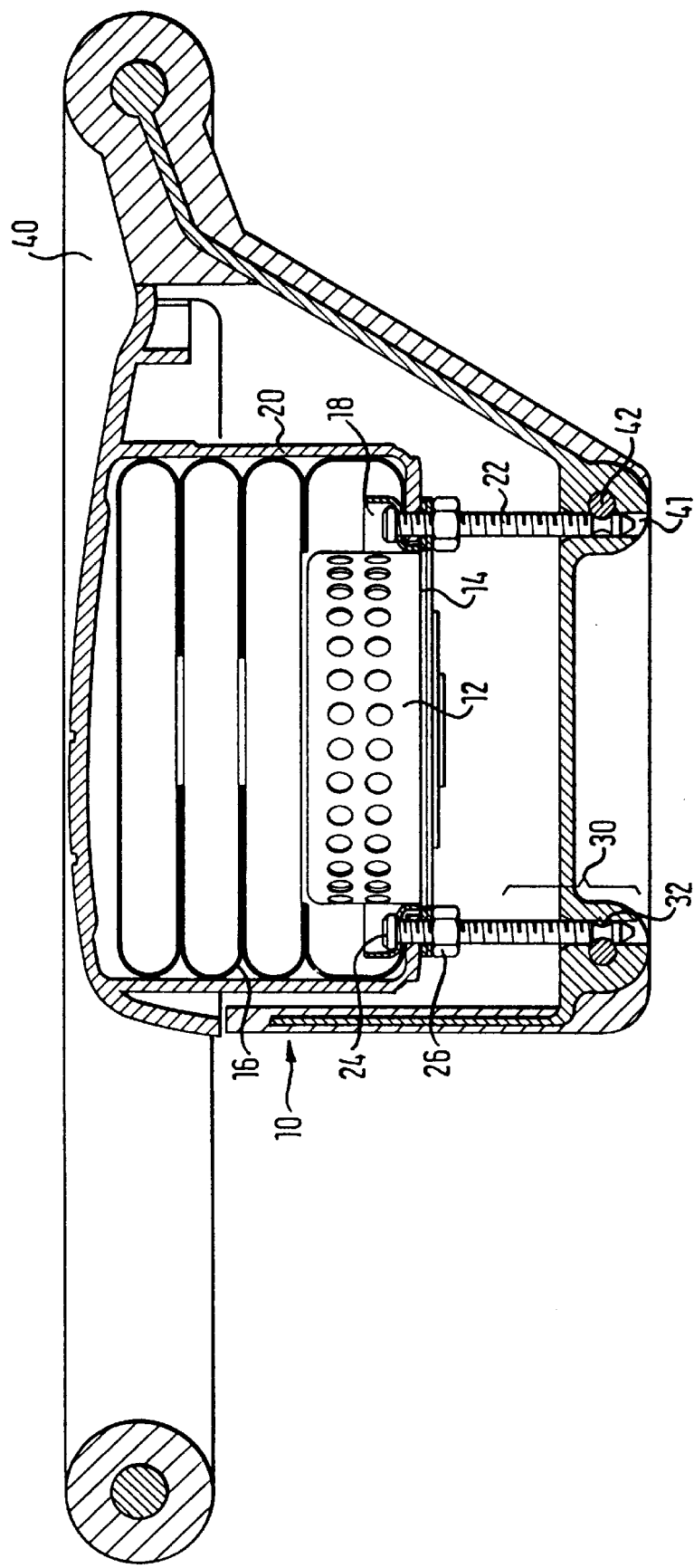

The gas bag module 10 shown in FIG. 1 comprises an inflator 12, provided with a mounting plate 14, as well as a gas bag 16 in fluid communication with the inflator 12, a holding ring 18 and a gas bag cover 20. The holding ring 18, the rim of the inflation opening of the gas bag 16, the cover 20 and the mounting plate 14 of the inflator 12 are firmly connected to each other by bolts 22. These bolts 22 feature at the end arranged in the interior of the gas bag module 10 an abutment head 24 as well as a thread onto which a nut 26 is screwed. The holding ring 18, the gas bag 16, the gas bag cover 20 and the mounting plate 14 of the gas bag module 12 are clamped in place between the abutment head 24 and the nut 26. To facilitate installation it may be provided for that the bolts 22 are firmly held in the holding ring 18 by means of a press-fit.

At their ends located outside of the gas bag module 10, the bolts 22 are provided with a fastening projection 30 which features a groove 32 oriented circumferentially. For fitting the gas bag module 10 in accordance with the invention to the vehicle steering wheel 40 shown schematically (or to any other part of the vehicle), the fastener projections 30 of the bolts 22 are inserted into suitable mounting holes 41. Then, arresting parts 42 extending perpendicular to the bolts 22 are inserted in suitable drilled holes so that they engage the circumferential grooves 32 and prevent the bolts 22 from being pulled out of the mounting holes 40. Accordingly, the gas bag module 10 in accordance with the invention is fitted securely and reliably to the vehicle at minimum expense.

I claim:

1. A gas bag module for a vehicle occupant restraint system, including an inflator, a gas bag and at least two fastener bolts, each of said fastener bolts comprising a fastening projection protruding outside of said gas bag module for fastening said gas bag module to a vehicle part and an abutment head at an end located in the interior of said gas bag module, wherein said gas bag is provided with an inflation opening having a rim and wherein said fastener bolt has an external thread, said rim being clamped between said abutment head and a nut screwed onto said external thread of said fastener bolt.

2. A gas bag module for a vehicle occupant restraint system, including an inflator, a gas bag and at least two fastener bolts, each of said fastener bolts comprising a fastening projection protruding outside of said gas bag module for fastening said gas bag module to a vehicle part, wherein each of said bolts comprises an abutment head at an end located in the interior of said gas bag module, wherein said gas bag is provided with an inflation opening having a rim and each said fastener bolt has a shank having an external thread, said rim being clamped between said abutment head and a nut screwed onto said thread of said fastener bolt, wherein a holding ring is arranged in the interior of said gas bag, and wherein said inflator comprises a mounting plate, said fastener bolts being held in said holding ring by means of a press-fit, and said rim of said inflation opening of said gas bag being clamped between said holding ring and said mounting plate.

3. The gas bag module of claim 2, wherein a gas bag cover is provided, said gas bag cover being clamped between said holding ring and said mounting plate.

* * * * *